May 17, 1938.  G. W. WOLCOTT  2,117,468

REFRIGERATING APPARATUS

Filed July 31, 1934  3 Sheets-Sheet 1

Inventor

GLENN W. WOLCOTT

By Spencer, Harlan & Fisher

Attorney

May 17, 1938.　　　G. W. WOLCOTT　　　2,117,468
REFRIGERATING APPARATUS
Filed July 31, 1934　　　3 Sheets-Sheet 2
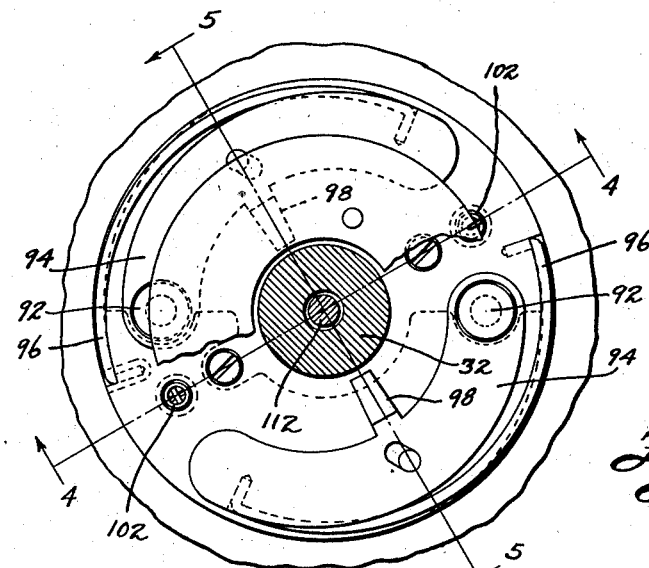
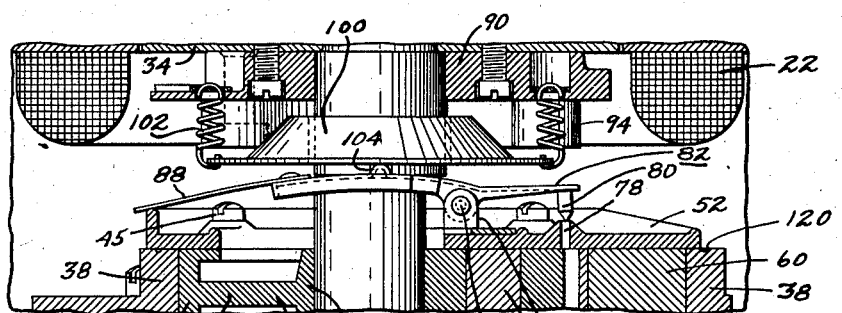
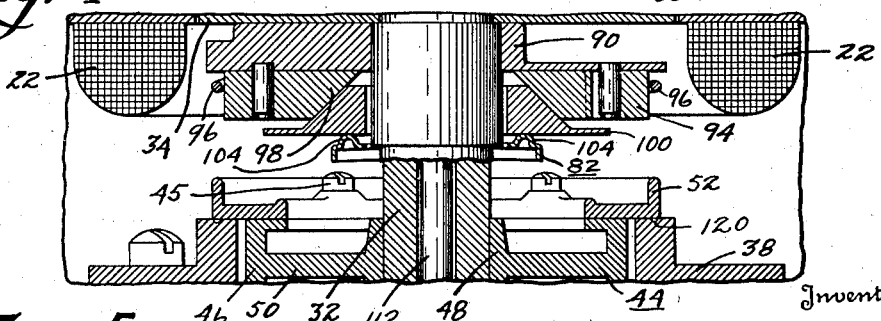
Fig. 3
Fig. 4
Fig. 5
Inventor
GLENN W. WOLCOTT
By Spencer, Hardman & Fish
Attorney May 17, 1938.  G. W. WOLCOTT  2,117,468
REFRIGERATING APPARATUS
Filed July 31, 1934  3 Sheets-Sheet 3
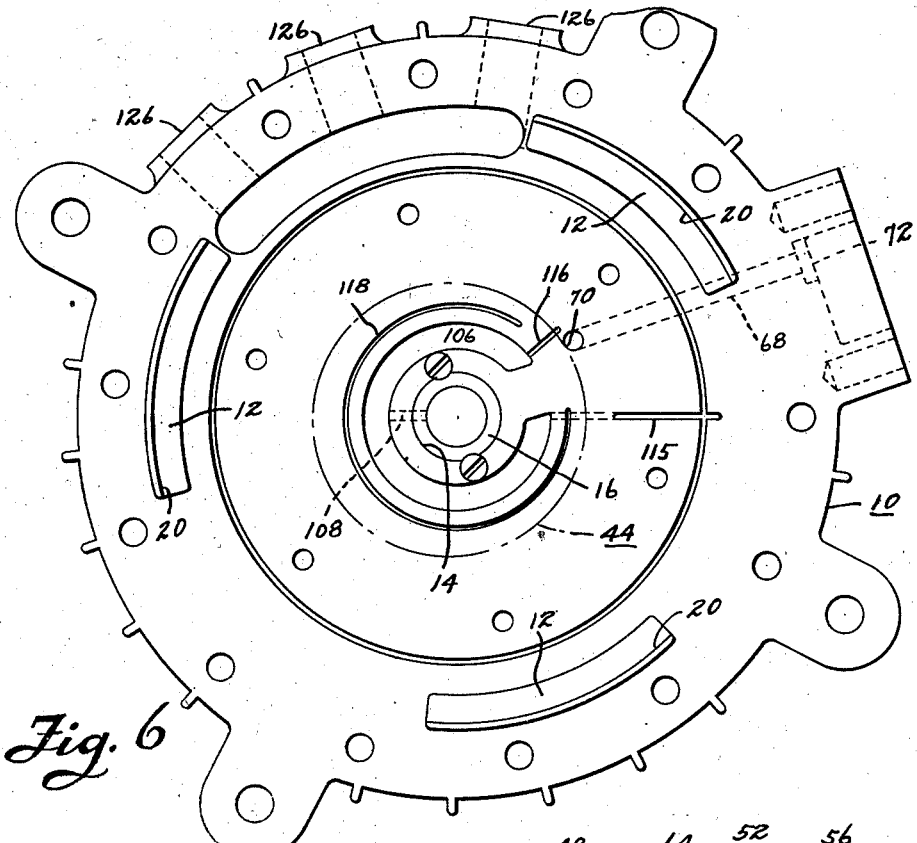
Fig. 6
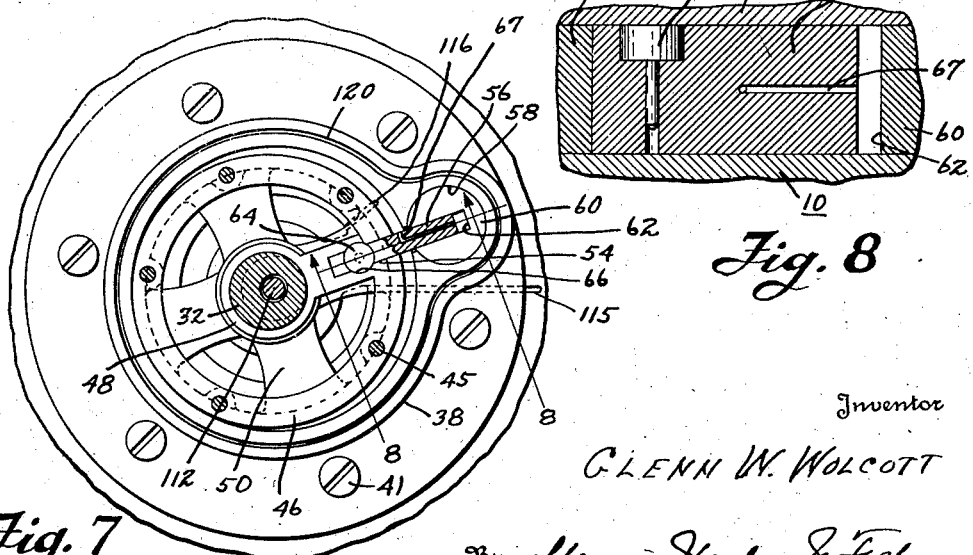
Fig. 7
Fig. 8
Inventor
GLENN W. WOLCOTT
By Spencer, Hardman & Fish
Attorney Patented May 17, 1938

2,117,468

UNITED STATES PATENT OFFICE 2,117,468

REFRIGERATING APPARATUS

Glenn W. Wolcott, Dayton, Ohio, assignor to General Motors Corporation, Dayton, Ohio, a corporation of Delaware Application July 31, 1934, Serial No. 737,789

9 Claims. (Cl. 230—207)

This invention relates to refrigerating apparatus and particularly to a motor-compressor unit of the hermetically sealed type for use in a refrigerating system.

It is an object of the invention to provide a motor-compressor unit which is more efficient in operation than similar units previously constructed.

The improved efficiency of this motor-compressor unit is largely derived from an improved mechanism for providing lubricant to the compressor mechanism, and to improved means for insuring a gas tight seal for the various running surfaces of the compressor.

It is, therefore, also an object to provide improved lubricating and sealing means for a motor-compressor unit, more particularly for one of the rotary type.

A further object is to provide an unloading mechanism of a simple and reliable construction which will be free from annoying noise in operation, and in which wear can be reduced materially.

A further object is to provide an improved frame construction for a motor-compressor unit preferably of the hermetically sealed type, which insures accurate permanent location of all the parts of the unit, and which is simple and economical to manufacture.

Further objects and advantages of the present invention will be apparent from the following description, reference being had to the accompanying drawings, wherein a preferred form of the present invention is clearly shown.

In the drawings:

Fig. 3 is a partial cross section on line 3—3 of Fig. 1;

Fig. 4 is a cross section on line 4—4 of Fig. 2;

Fig. 5 is a cross section on line 5—5 of Fig. 3;

Fig. 6 is a top view of the main frame of the illustrated embodiment;

Fig. 7 is a top view of the compressor mechanism of the embodiment illustrated; and Fig. 8 is a cross section on line 8—8 of Fig. 7.

Figure 1:
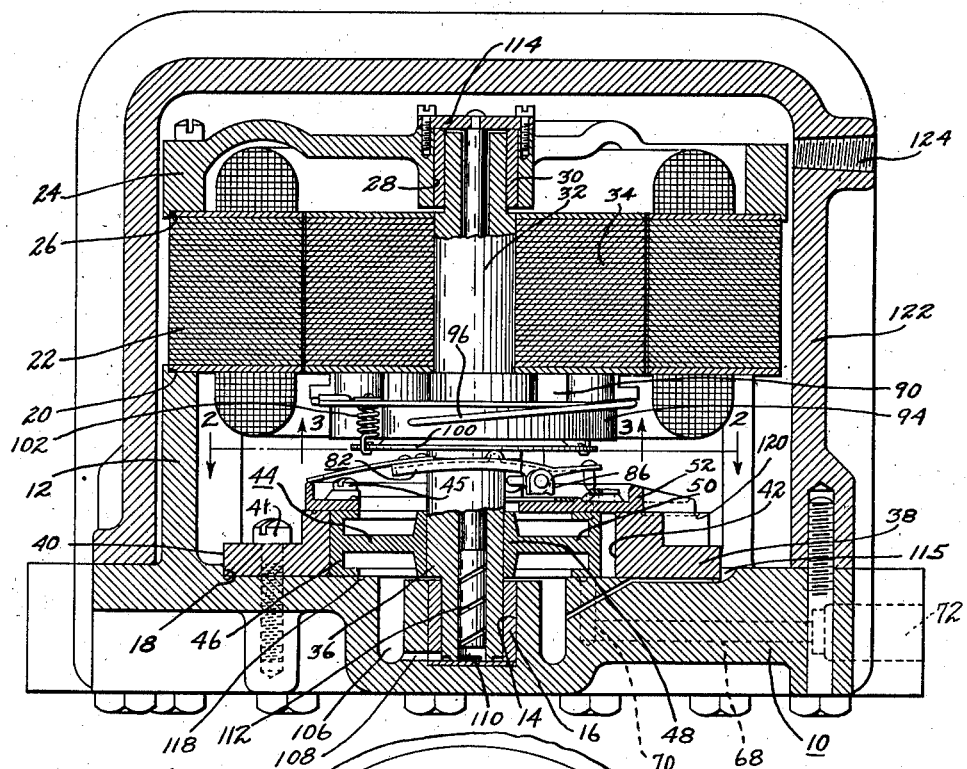
Fig. 1 is a vertical cross section of the motor-compressor unit embodying the present invention.

The motor-compressor unit illustrated comprises a main frame member 10 of generally flat plate-like form having motor supporting means 12 upstanding therefrom. The motor supporting means may preferably take the form of three sector shaped pillars which may be formed integrally with the remainder of the frame. The frame member 10 is provided with a plurality of machined surfaces or recesses of cylindrical form, and which are preferably formed on the member 10 in one machine, such as a lathe, while the member 10 is maintained in one position in the chuck of that machine. These recesses include a recess 14 which forms a shaft bearing and preferably carries a bushing 16 of bearing material, a recess 18 which forms a compressor seat and a recess 20 formed on the top of the motor supporting pillars to form a seat for a motor. Mounted on the seat 20 is a stator 22 of an electric motor having an accurately finished cylindrical outer surface and an accurate plane end surface perpendicular thereto. The outer cylindrical surface of the stator 22 is adapted to fit snugly in the recess 20, thus locating the stator concentric to each of the recesses on the main frame 10. Above the stator 22, there is provided a shaft bearing support in the form of a spider member 24 having a cylindrical recess 26 adapted to snugly engage the outer cylindrical surface of the stator 22. The spider 24 is adapted to form an upper shaft bearing by means of a cylindrical recess 28 formed therein concentric to the recess 26. A bushing 30 of bearing material may be provided in the recess 28.

Journaled in the bushings 16 and 30 is a hollow shaft 32 carrying rigidly thereon the rotor 34 of the electric motor and having formed thereon at its lower end an eccentric outer journal 36. Beneath the motor, there is provided a rotary compressor which may comprise a cylinder or body member 38 having an external cylindrical surface 40 adapted to be located snugly in the recess 18 and retained therein by bolts 41. The surface 40 is concentric with the inner cylindrical surface 42 of the cylinder member 38.

An impeller 44 is provided for the compressor and takes the form of a cylindrical rim portion 46 connected to a central hub portion 48 by a plurality of spokes 50. The hub member 48 is adapted to form a bearing on the eccentric journal 36. Secured to the impeller 44 by bolts 45 is a cover member 52 adapted to overlie the top plane face of the cylinder 38. The impeller 44 has a radial slot 54 formed therein to receive a divider block 56. At one side of the cylindrical bore in the cylinder 38 there is provided a second smaller cylindrical bore 58 adapted to receive a cylindrical pivot member 60 having a slot 62 therein, in which the divider block 56 is adapted to freely slide. The divider block 56 is secured to the impeller 44 by means of a locking pin 64 having a cylindrical head of greater diameter than the width of the divider block 56. Retention of the divider block is provided by the locking pin 64 which fits snugly in a corresponding bore 66 in the impeller 44.

A small bore 67 is provided in the divider block 56 to connect the chamber in pivot member 60 at the end of divider block 56 with the inlet side of the compression chamber for preventing pressure differences from building up therebetween.

Figure 2:
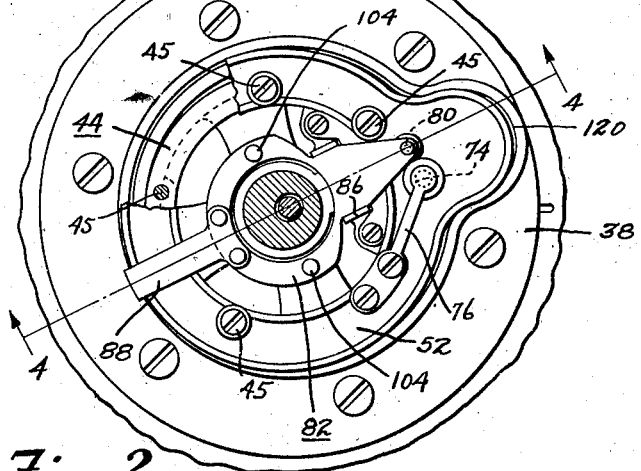
Fig. 2 is a partial cross section on line 2—2 of Fig. 1.

Admission of gas to be compressed is provided for by a bore 68 in the frame member 10 communicating with the vertical bore 70 therein, establishing communication with the compression chamber adjacent one side of the divider block 56. The bore 68 communicates with an inlet connection 72 of any suitable construction, and may also form a receptacle for a check valve (not shown). The cover plate 52 is provided with an exhaust port 74 (see Fig. 2) communicating with the compression chamber at the opposite side of the divider block, and is provided with a flapper valve 76 of usual construction.

In order to insure starting of the compressor unit with ease, an unloading device is provided which comprises preferably of an unloading port 78 (see Fig. 4) in the cover plate 52 adapted to establish communication between the inlet side of the compression chamber and the top of the cover plate 52. A valve 80 controls the port 78 and is in turn carried by a valve operating lever 82 which is pivoted at 84 to a bracket 86 secured to the cover plate 52. Normally, the valve 80 is retained in closed position by a leaf spring 88 at the opposite end of the valve operating lever 82. Control of the valve operating lever 82 is provided by means of a speed responsive mechanism comprising a plate member 90 secured to the rotor 34 and having pivoted thereto at 92 a pair of centrifugal weights 94 (see Fig. 3). Each of the weights 94 is biased to its innermost portion by means of tension springs 96 anchored to the weights 94 and the plate 90. It will be seen that a line joining the anchorages of each spring passes inwardly of the pivot 92 resulting in a bias on the weights 94 which is inward, although the springs 96 are positioned outwardly of the weights 94. It will also be seen that the spring bias on the weights 94 varies with their movement outwardly, since as the weights move outwardly, the line joining the spring anchorages tends to approach the pivot 92, thus giving the centrifugal force of the weights 94 a greater mechanical advantage on the springs 96.

Means is provided for transmitting the motion of the weights 94 under centrifugal force to the valve operating lever 82 and preferably comprises an angular cam surface 98 formed on an inward extension of each of the weights 94. The cam surfaces 98 are adapted to coact with a cone member 100 slidably mounted on the shaft 32 and which has a plane bottom surface. Light springs 102 are connected between the plate 90 and the cone 100 in order to lightly retain the cone 100 in engagement with the cams 98 at all positions. The bottom surface of the cone 100 is adapted to engage in its lowermost position a pair of bosses 104 provided on the valve operating lever 82 in order to lift the valve 80 away from the port 78.

To increase the efficiency of the compressor, means are provided to insure the proper amount of lubrication for all of its parts, as well as to provide a fluid seal on the running surface of the compressor. Referring again to Fig. 1, a lubricant well or sump 106 is formed in the frame 10 surrounding the lower shaft bearing 16 and communicates by means of a duct 108 with the lower bearing 16 to maintain a supply of lubricant in the bearing. A lubricant slot 110 is provided in the bottom of the hollow shaft 32 to admit lubricant to the interior of the shaft. A lubricant feed screw 112 is provided inside the shaft 32 and is supported from the spider 24 by means of a plate 114. Sufficient clearance is provided above the screw portion 112 to permit a generous supply of oil to be forced upwardly through the hollow shaft 32 to the top bearing 30. A lubricant return duct 115 is formed in the plate 10 to feed excess lubricant from outside compressor body 38 to the sump 106.

Referring now to Fig. 6, there is provided in the upper surface of the frame plate 10 a lubricant feeding groove 116 extending from the sump 106 to a point very slightly outwardly of the innermost position of the outer edge of the impeller 44. The groove 116 is of rather small cross section and its outer end is so situated with respect to the impeller 44 that only a very small quantity of oil can pass through the groove 116 whenever its end is uncovered by the impeller 44 at normal running speed. For example, in a one-eighth H. P. compressor, the groove 116 should be so proportioned as to admit approximately one or two drops at each revolution at a speed of 1750 R. P. M.

In order to seal the surface between the bottom of the impeller 44 and the frame plate 10, a sealing groove 118 is provided in the top surface of the plate 10. The position of the groove 118 is such that every portion thereof will be uncovered by the inner edge of the impeller rim 46 at some time during one revolution of the shaft 32, but at all times the major portion of the groove 118 is covered by the impeller 44. A similar sealing groove 120 (see Fig. 7) is provided in the top surface of the cylinder 38, and is so formed and positioned that the outer edge of the cover plate 52 uncovers every portion thereof at some time during each revolution of the shaft 32, but that at all times, the major portion of the groove 120 is covered.

The motor-compressor unit may also include a cover member or dome 122 adapted to be securely sealed to the frame plate 10 and having an outlet connection 124. The electrical connections for the motor may be brought in in any suitable manner, for example, through lead-in passages 126 provided in the frame member 10 which are adapted to be hermetically sealed in a suitable manner.

In operation, the motor-compressor unit may be supplied with electrical energy by connections (not shown) extending through the lead-in passages 126 to cause rotation of the rotor 34 and shaft 32. The eccentric 36 causes the impeller 44 to partake of a rolling motion about the inner surface 42 of the cylinder 38 causing gas to be drawn in through the inlet port 70 and expelled through the exhaust port 74 into the hollow chamber within the dome 122. Sufficient oil or other lubricant is maintained inside the unit to fill the sump 106 at all times and maintain a level slightly above the top thereof. Inasmuch as the lubricant in the sump 106 is under the pressure of the compressed gas within the interior of the dome 122, at each time that the end of the oil groove 116 is uncovered, the difference in pressure between the lubricant in the sump 106 and the suction side of the compression chamber will cause a small charge or "shot" of lubricant to be injected into the compression chamber. The amount of lubricant injected is sufficient only to provide a seal between the impeller 44 and the inner wall of the cylinder 38, and to seal the divider block 56. A small quantity of lubricant will be continually ejected from the exhaust port 74 and acts to quiet the action thereof.

The lubricant ejected from the exhaust port 74 flows over the cover plate 52 and drains therefrom over the right hand outer edge where the rim thereof is lower than at other portions and also over the low rim at the central opening in the cover plate. Lubricant from the sump 106 is also fed to the bearing 16 through the duct 108 and is delivered under slight pressure to the bearing 30 by means of the feed screw 112. The excess lubricant from the bearing 30 flows over the rotor 34 and through the gap between it and the stator 22 to drop onto the top of the compressor and provide a film constantly flowing over the top surface of the cylinder 38. As the groove 120 is uncovered in its various portions, this film of oil fills the same and provides a seal between the cover plate 52 and the top of the cylinder 38. Lubricant from the sump 106 fills the groove 118 whenever portions of it are uncovered by the inner edge of the rim 46 of the impeller, maintaining a seal between the bottom surface of the impeller 46 and the frame plate 10. It will be seen that there are two principal lubricant circuits. The first is from the sump 106 through duct 108 to bearing 16, through slot 110, feed screw 112 and hollow shaft 32 to upper bearing 30, over rotor 34 through the air gap and over the top of the cylinder body 38 to drain duct 115. The second is from sump 106 through feed groove 116, through the compression chamber and exhaust port 74 to the top of cover plate 52 whence it returns to sump 106 through the impeller 44 and also over the right hand end of cylinder 38 and through drain slot 115.

When the motor-compressor unit is started after an idle period, the unloading mechanism comes into operation to unload the compressor to permit easy starting of the motor. When the motor is at rest, the centrifugal weights 94 lie in their innermost position as shown in Fig. 3 and when in this position, maintain the cone 100 in its lowermost position engaging the bosses 104 to hold the valve operating lever 82 in valve opening position. This maintains the bypass 78 open permitting the high pressure gas in housing 122 to enter the inlet side of the compressor, thus equalizing the pressures on both sides of the compressor. A check valve (not shown) may be provided in the inlet line to prevent flow of high pressure gas to the low side of the refrigerating system. In starting, therefore, the motor comes up nearly to normal running speed without load. Just before the normal running speed is reached, the centrifugal weights 94 are drawn outwardly due to the centrifugal force thereof overcoming the springs 96. This permits the cone 100 to rise under the action of the springs 102 and clear the bosses 104, thus permitting spring 88 to close the port 78 by the valve 80. During normal running, the unloading mechanism parts lie in this position, and it will be seen that the springs 102 act to maintain all the parts of the unloading mechanism above the cone 100 in snug engagement to prevent rattles or other noises in operation. Also during normal running, the cone 100 is free of the bosses 104, thus eliminating to a great degree, the wear on all parts of the unloading mechanism.

While the form of embodiment of the invention as herein disclosed, constitutes a preferred form, it is to be understood that other forms might be adopted, all coming within the scope of the claims which follow.

What is claimed is as follows:

1. In a motor-compressor unit, a base having a main shaft lower bearing, an upstanding motor support on said base, a spider on and above said motor support, a bearing on said spider, a compressor on said base above said main shaft lower bearing, a motor stator on said motor support, a hollow main shaft in said bearings, a motor rotor and an eccentric on said main shaft between said bearings, a stationary lubricant feed screw supported within said main shaft from said spider, and a bell sealed to said base independently of said motor support.

2. In a motor-compressor unit, a base having a main shaft lower bearing, an upstanding motor support on said base, a spider on and above said motor support, a bearing on said spider, a compressor on said base above said main shaft lower bearing, a motor stator on said motor support, a hollow main shaft in said bearings, a motor rotor and an eccentric on said main shaft between said bearings, a stationary lubricant feed screw supported within said main shaft, and a bell sealed to said base independently of said motor support.

3. A centrifugal unloading device comprising a compressor unit having a compression chamber and a by-pass opening, a valve cooperating with said opening for unloading the compressor, a valve operating member having means normally to bias said valve to closed position, a drive shaft for said compressor, centrifugal speed responsive weight means associated with said drive shaft having biased actuating surfaces, motion transmitting means between the speed responsive weight means and the valve operating member and including a ring having a biased surface cooperating with said biased actuating surfaces, spring means acting to take up slack in said motion transmitting means in all positions and operable to hold said motion transmitting means out of engagement with said valve operating member during loaded operation of the compressor.

4. A piston for a compressor comprising a cylindrical member having a slot, opposed notches in the walls of said slot, a divider block in said slot extending beyond the periphery of said member, a key-way in said divider block and a locking pin in said key-way having portions engaging in said notches.

5. A piston for a compressor comprising a cylindrical member having a slot, opposed circular recesses in the walls of said slot, a divider block in said slot extending beyond the periphery of said member, a key-way in said divider block and a locking pin in said key-way, and having a head locked in said recesses.

6. A centrifugal unloading device for a motor-compressor unit comprising an impeller provided with a by-pass opening, a valve on said by-pass opening for unloading the compressor, a valve operating member having means normally to bias said valve to closed position, a vertical drive shaft for said impeller, centrifugal speed responsive weights associated with said drive shaft having biased lower surfaces, and means whereby movement of said weights imparts movement to the valve operating member, said last named means including a ring having a biased upper surface cooperating with said biased lower surfaces and also including spring mechanism for holding said biased surfaces in engagement and operable to hold said last named means out of engagement with said valve operating member during loaded operation of the compressor.

7. A centrifugal unloading device for a compressor unit having a by-pass opening, a valve on said by-pass opening for unloading the compressor, a valve operating member having means normally to bias said valve to closed position, a drive shaft for said compressor, centrifugal speed responsive cam means movable outwardly from said shaft upon an increase in shaft speed, and motion transmitting means whereby movement of said cam means imparts movement to the valve operating member, said last named means including a cam follower and spring means for holding said cam follower in engagement with said cam means in all positions of said cam means and for holding said motion transmitting means out of engagement with said valve operating member during loaded operation of the compressor.

8. In a rotary compressor, the combination of a cylinder having an end wall, a lubricant supply chamber, an impeller within said cylinder in contact with said wall, means imparting a planetating motion to said impeller, and fluid sealing means between the impeller and end wall including a circular groove in said end wall concentric with the axis of said cylinder, said impeller and said groove being so constructed and related that a major portion of said groove is covered by said impeller at all positions of the impeller and every portion of the groove is successively uncovered thereby and exposed to lubricant from said chamber at least once during each cycle of planetation of the impeller.

9. In a rotary compressor, a substantially horizontal base plate, an oil sump in said base plate, an upstanding bearing in said sump, a vertical drive shaft in said bearing and having an eccentric, a stationary cylinder secured to said base plate around said sump, an impeller supported on said plate in pumping engagement with said cylinder, said impeller having a central bore bearing on said eccentric whereby said impeller is cyclically planetated by said eccentric during rotation of said drive shaft, and a circular groove in said base plate concentric with said bearing, the relationship between the impeller and the groove being such that a major portion of the groove is covered by said impeller at all positions of the impeller and every portion of the groove is successively uncovered thereby and exposed to oil from said sump at least once during each cycle of planetation of the impeller.

GLENN W. WOLCOTT.